United States Patent
Hanson et al.

(10) Patent No.: US 7,043,198 B2
(45) Date of Patent: May 9, 2006

(54) MOBILE SATELLITE COMMUNICATION SYSTEM UTILIZING POLARIZATION DIVERSITY COMBINING

(75) Inventors: Duke Edward Hanson, Queen Creek, AZ (US); Thomas Peter Emmons, Jr., Mesa, AZ (US); Robert Anthony Peters, Silver Spring, MD (US); James William Startup, Tempe, AZ (US); Peter Monsen, Stowe, VT (US); Norbert Kleiner, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 658 days.

(21) Appl. No.: 10/236,428

(22) Filed: Sep. 6, 2002

(65) Prior Publication Data

US 2003/0008614 A1  Jan. 9, 2003

Related U.S. Application Data

(62) Division of application No. 09/517,975, filed on Mar. 3, 2000.

(51) Int. Cl.
*H04B 7/185* (2006.01)

(52) U.S. Cl. .............. 455/13.1; 455/303; 455/296; 455/456.1

(58) Field of Classification Search ........... 455/13.1, 455/296, 303–306, 456.1–456.6, 429; 342/361, 342/359–366, 371–374
See application file for complete search history.

(56) References Cited

U.S. PATENT DOCUMENTS

| | | | |
|---|---|---|---|
| 3,742,506 A | | 6/1973 | Wilkinson |
| 3,835,392 A | | 9/1974 | Mahner et al. |
| 4,112,370 A | | 9/1978 | Monsen |
| 4,376,940 A | * | 3/1983 | Miedema ............... 343/840 |
| 5,036,331 A | | 7/1991 | Dallabetta et al. |
| 5,068,868 A | | 11/1991 | Deppe et al. |
| 5,485,485 A | | 1/1996 | Briskman et al. |
| 5,548,292 A | | 8/1996 | Hirshfield et al. |
| 5,691,727 A | | 11/1997 | Cyzs |
| 5,724,666 A | | 3/1998 | Dent |
| 5,822,429 A | | 10/1998 | Casabona et al. |
| 5,839,053 A | * | 11/1998 | Bosch et al. ............ 455/13.1 |
| 5,995,044 A | * | 11/1999 | Kunysz et al. .......... 342/363 |
| 6,125,261 A | * | 9/2000 | Anselmo et al. ......... 455/12.1 |
| 6,163,296 A | | 12/2000 | Lier et al. |
| 6,272,317 B1 | * | 8/2001 | Houston et al. .......... 455/13.1 |
| 6,339,611 B1 | * | 1/2002 | Antonio et al. ......... 342/361 |
| 6,392,596 B1 | | 5/2002 | Lin et al. |
| 6,526,278 B1 | * | 2/2003 | Hanson et al. ........... 455/427 |
| 6,535,734 B1 | * | 3/2003 | Miller et al. ............ 455/429 |

* cited by examiner

*Primary Examiner*—Lana Le
(74) *Attorney, Agent, or Firm*—Frank J. Bogacz; Kevin D. Wills (57) ABSTRACT

The present invention utilizes a dual polarization reception system (200) that utilizes the energy available in orthogonal polarizations to effectively increase link margin, thereby allowing for adequate signal quality reception in difficult environments. A co-polarized and a cross-polarized signal are separately downconverted and demultiplexed. The signals from each demultiplexed output are then sampled and weighted. The weighted samples for each polarity are combined in soft decision combining/decoding circuitry (255, 360), and this circuitry determines the most likely state of a received symbol's transmitted value.

7 Claims, 4 Drawing Sheets

MOBILE SATELLITE COMMUNICATION SYSTEM UTILIZING POLARIZATION DIVERSITY COMBINING

Divisional prior applicaton Ser. No. 09/517,975 filed Mar. 3, 2000.

FIELD OF THE INVENTION

The present invention relates to satellite based mobile communications systems, and more particularly, to the utilization of polarization diversity to reduce fading in such systems.

BACKGROUND OF THE INVENTION

Digitally modulated satellite and terrestrial mobile communications systems generally receive only a single polarization of a transmitted signal (e.g. vertical, horizontal, left-hand or right-hand circular). However, electromagnetic waves propagating in the vicinity of a mobile communications system user are subjected to significant scattering and because the sources of scattering are randomly oriented, there is cross coupling of polarizations. The embodiments of this invention take advantage of the uncorrelated nature of each polarization path to reduce the depth of fades by receiving and combining dual polarizations.

It is highly desirable to be able to use mobile satellite communication devices inside of buildings and automobiles. Unfortunately, maintaining a reliable link in these environments generally requires significant raw link margin. The additional margin is principally obtained by increasing radiated power and antenna size. Both of these options are very costly. Increasing radiated power increases power consumption and decreases operating time on a single battery charge. Increasing the satellite antenna gain by increasing antenna aperture size causes difficulties in terms of power consumption, physical size, stowage, and deployment.

Difficult propagation environments such as in-building communications contain significant randomly oriented scatterers and reflectors which tend to randomize the polarization of the signal at the receiving antenna. Additionally, in these multipath environments, signal fades in one polarization tend to occur at different times than signal fades in an orthogonal polarization. Therefore, there is a need for a satellite mobile communications system that can take advantage of the power available in the cross-polarized signal.

DETAILED DESCRIPTION OF A PREFERRED EMBODIMENT

Satellite and terrestrial mobile communications systems generally receive only a single polarization of a transmitted signal (e.g. vertical, horizontal, left-hand or right-hand circular). However, electromagnetic waves propagating in the vicinity of a mobile communications system user are subjected to significant scattering and because the scatterers are randomly oriented, there is cross coupling of polarizations. The method and apparatus of the present invention take advantage of the uncorrelated nature of each polarization path to reduce the depth of fades by receiving and combining dual polarizations.

The present invention utilizes a dual polarization reception system that utilizes the energy available in orthogonal polarizations to effectively increase link margin, thereby allowing for adequate signal quality reception in difficult environments. In the preferred embodiment of the invention, the two polarizations are separately downconverted and demultiplexed. Signals from each demultiplexed output are sampled and weighted. The weighted samples for each polarity are combined in soft decision combining/decoding circuitry that determines the most likely state of the received symbol's transmitted value. The combining circuitry can be as simple as adding the weighted samples together, which is equivalent to adding the signal energies together.

Figure 1:
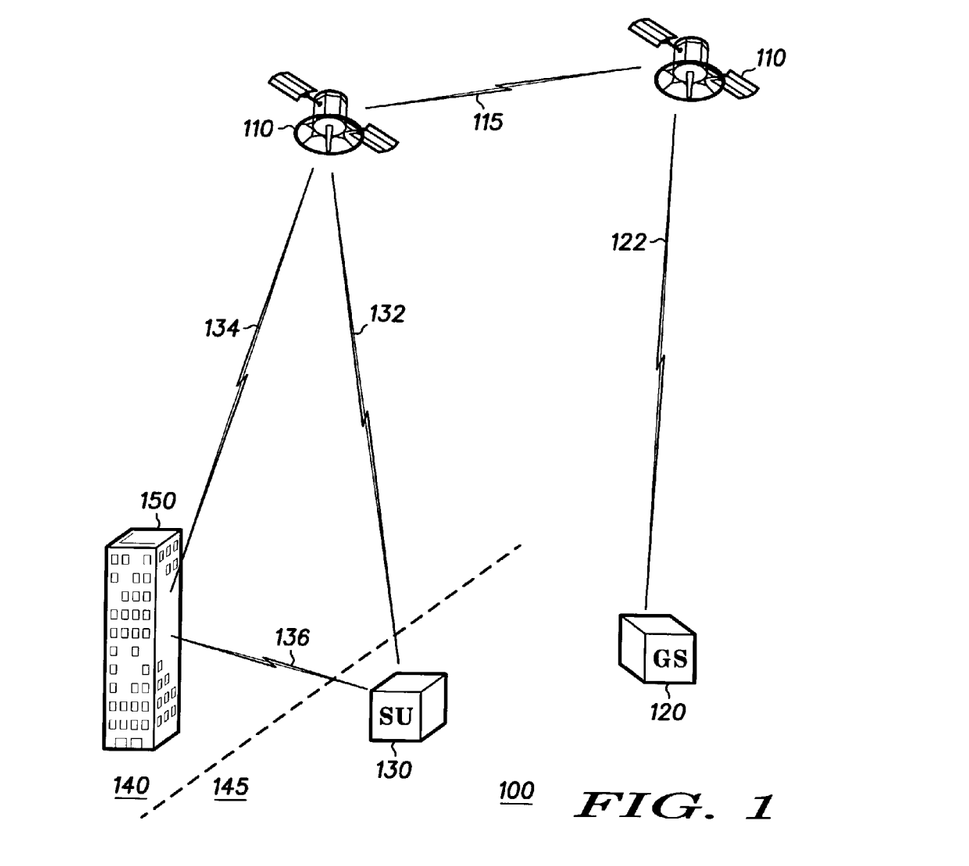
FIG. 1 illustrates a simplified diagram of a satellite communications system in accordance with a preferred embodiment of the present invention.

FIG. 1 illustrates a simplified diagram of a satellite communications system in accordance with a preferred embodiment of the present invention. In a preferred embodiment, satellite communications system 100 comprises a number of communications satellites 110, at least one ground station 120, and at least one subscriber unit (SU) 130. Satellite communications system 100 utilizes single transmit polarization and dual polarization reception and combining techniques to improve channel quality and reduce fading.

For clarity, FIG. 1 illustrates only two communications satellites 110, a single ground station 120, and a single SU 130. This is done to facilitate the explanation of the invention. Different numbers of communications satellites, ground stations, and SUs can be used. While the present invention is advantageously employed when a large number of satellites are being used, it is also applicable with as few as a single satellite.

In a preferred embodiment, communications satellites 110 communicate with other communications satellites 110 using crosslinks 115. In FIG. 1, a single crosslink is illustrated. This is done to facilitate the explanation of the invention. In a preferred embodiment, a number of communications satellites and crosslinks are used. In alternate embodiments, various numbers of communications satellites and crosslinks can be used. In alternate embodiments, communications satellites 110 can communicate with each other using bent pipe links with ground stations and combinations of space-based crosslinks and terrestrial links.

Communications satellites 110 communicate with ground stations 120 using communication links 122. For example, communication links 122 are used to provide command and control information to the satellites. In addition, communication links 122 can be used to provide status information to the ground stations. Communications links 122 are also used to transfer traffic information between the satellites and the ground stations.

Communications satellites 110 communicate with SUs 130 using communication links 132. At least one secondary path, as illustrated by 134 and 136, can also exist between communications satellite 110 and SU 130 due to scatterers, such as illustrated by element 150.

In a preferred embodiment, co-polarized signals are received by satellite 110 and SU 130 via direct links as illustrated by 132, and cross-polarized signals are received by satellite 110 and SU 130 via indirect links as illustrated by 134 and 136.

Generally, communications system 100 can be viewed as a network of nodes. For example, communications satellites 110, ground stations 120, and SUs 130 can be viewed as nodes in communications system 100. All nodes of communications system 100 are or can be in data communication with other nodes of communications system 100 through communication links such as those illustrated by links 115, 122, 132, 134, and 136. In addition, all nodes of communications system 100 are or can be in data communication with other devices dispersed throughout the world through satellite or terrestrial networks coupled to communications system 100 through ground stations and subscriber units. In alternate embodiments, one or more of the nodes can be a system control center.

Desirably, communications satellites 110 include array antennas (not shown). The invention is applicable to communications satellites 110 that use single or multiple beams pointed towards the earth. The invention is also applicable to systems where full coverage of the earth is not achieved.

The invention is applicable to SUs that move with respect to sources of scattering and their associated depolarized signals. The invention is also applicable to communications satellites that move with respect to sources of scattering and their associated depolarized signals. The invention is also applicable to communications system in which the sources of scattering change with respect to time and/or location.

In a preferred embodiment, at least one communications channel is provided between ground station 120 and SU 130 using links 115, 122, 132, 134, and 136. These communications channels are used to exchange messages between satellites 110, ground stations 120 and SUs 130 during single and dual polarization reception procedures. In FIG. 1, links 115, 122, 132, 134, and 136 are illustrated as bi-directional links. This is not required for the invention. In alternate embodiments, links 115, 122, 132, 134, and 136 can be unidirectional links.

In a preferred embodiment, links 115, 122, 132, 134, and 136 encompass a limited portion of the electromagnetic spectrum that is divided into channels. Links 115, 122, 132, 134, and 136 can encompass any suitable multiple access scheme such as Frequency Division Multiple Access (FDMA) and/or Time Division Multiple Access (TDMA) and/or Code Division Multiple Access (CDMA) communications channels or combinations thereof.

In a preferred embodiment, at least one SU 130 in system 100 has been adapted to perform dual polarization reception procedures, as described below. SUs 130 are preferably communications devices, which receive data from and transmit data to communications satellites 110. By way of example, SUs 130 can be cellular telephones, paging devices, computers, or other communication devices adapted to communicate with communications satellites 110. SUs 130 include, among other things, means for presenting messages and means for receiving user inputs in response to the presentation of message information. SUs 130 can be located anywhere on the surface of the earth or in the atmosphere above the earth. SUs 130 can be located and/or moved into buildings by users.

In a preferred embodiment, at least one satellite 110 in system 100 has been adapted to perform dual polarization reception procedures, as described below. Satellites 110 are preferably communications devices, which receive data from, transmit data to other communications satellites 110, SUs 130, and ground stations 120.

For example, ground station 120 can be a system control center or be connected to one or more system control centers. In addition, ground station 120 can also be a gateway (GW) or be connected to one or more gateways, which provide access to at least one terrestrial-based communications network, such as the public switched telephone network (PSTN) or other communications facilities (not shown in FIG. 1). In alternate embodiments, ground stations 120 can be mobile or fixed communications devices, which transmit data to and receive data from satellites 110.

In a preferred embodiment, at least one ground station 120 is responsible for maintaining data records for SUs 130. For example, data records can include subscriber information, and reception information. Subscriber information can include, among other things, subscriber location and current status (i.e., single, or dual polarization mode). Location information can include preferred mode information, geo-location information, and geo-political boundary information. Registration information can include, among other things, display information that is used to inform the user of the current registration region, allowable modes, allowable registration regions, current location, rates, and status. In alternate embodiments, data records may be maintained on the satellite 110.

In addition, FIG. 1 shows first region 140 and second region 145. In a preferred embodiment, first region 140 represents a first reception region, and second region 145 represents a second reception region. Reception regions are established within communications system 100 for regions having defined reception levels and fading characteristics. For example, good reception regions are defined where single polarization reception procedures are used, and poor reception regions are defined where dual polarization reception procedures are used.

Figure 2:
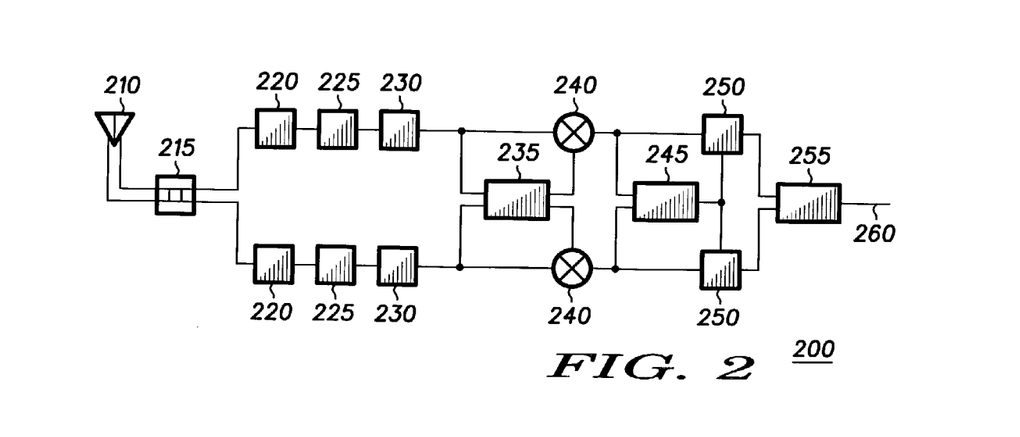
FIG. 2 shows a simplified block diagram for a dual polarization receiver subsystem in accordance with a preferred embodiment of the invention.

FIG. 2 shows a simplified block diagram for a dual polarization receiver subsystem 200 in accordance with a preferred embodiment of the invention. In a preferred embodiment, SU (130, FIG. 1) comprises at least one dual polarization receiver subsystem 200. The signals transmitted from a satellite to a SU can undergo scattering and reflection that produce signals in orthogonal polarizations, and the at least one dual polarization receiver subsystem is used to receive one or more of the un-scattered signals and one or more of the scattered signals.

Dual polarization receiver subsystem 200 comprises antenna 210, hybrid coupler 215, down-converters 220, analog-to-digital (A/D) converters 225, demultiplexers 230, residual carrier recovery circuits 235 and 240, symbol timing recovery circuit 245, soft decision computing circuits 250, and soft decision combining/decoding circuit 255.

In a preferred embodiment, dual polarization receiver subsystem 200 comprises a single antenna 210 that is capable of receiving two orthogonal polarizations. Those skilled in the art will recognize that dual polarization receiver subsystem 200 can comprise one or more antennas.

In alternate embodiments, antenna 210 can also comprise a controller for selecting antenna polarization. In addition, antenna 210 can be operated as a single polarization device in transmit and/or receive modes.

Hybrid coupler 215 is coupled to antenna 210 and converts from one basis set of polarizations to another. In a preferred embodiment, horizontal and vertical polarizations are converted to left-hand and right-hand circular polarizations. Hybrid coupler 215 provides a co-polarized signal and a cross-polarized signal.

In a preferred embodiment, hybrid coupler 215 is coupled to two down-converters 220, which downconvert the co-polarized and the cross-polarized signals. Each down-converter 220 is coupled to an A/D converter 225, and the downconverted signals are sampled using the analog to-digital converters.

A/D converters 225 are coupled to demultiplexers 230. The desired user signal is demultiplexed from those intended for other users. The design of the demultiplexer depends upon the multiple access scheme used in the system. In a preferred embodiment, an FDMA demultiplexer is used that comprises one or more matched filters. For CDMA systems, the demultiplexer would include one or more code despreading functions. For TDMA systems, the demultiplexer would include switching and timing functions.

Residual carrier recovery circuits 235 and 240 are coupled to both demultiplexers 230 and utilize information from the co-polarized signal and the cross-polarized signal to remove Doppler shifts. Residual carrier recovery circuits 235 and 240 track the residual carrier phase for the co-polarized signal and the cross-polarized signal, since significant carrier phase differences can exist between the co-polarized signal and the cross-polarized signal.

Symbol timing recovery circuit 245 is coupled to outputs on residual carrier recovery circuits 240. Symbol timing recovery is achieved using information from the co-polarized signal and the cross-polarized signal. In a preferred embodiment, there is negligible propagation delay difference compared to the symbol rate for the co-polarized signal and the cross-polarized signal, and a single output from symbol timing recovery circuit 245 is used.

Soft decision computing circuits 250 are coupled to outputs on residual carrier recovery circuits 240 and to an output on symbol timing recovery circuit 245. Soft decision computing circuits 250 capture samples of the waveform at optimum times within a symbol. Thus, soft decision samples exist at the output of the soft decision computing circuits 250. The soft decision computing circuit's output can be broadly defined as an estimate of a received signal's transmitted value. For example, the soft decision can be computed with the aid of a locally generated reference signal, or the soft decision can be computed by simple quantization of the received symbol after carrier recovery and symbol timing.

Those skilled in the art will recognize that the order in which the operations are performed could be changed in alternate embodiments. Those skilled in the art will also recognize that error correction coding can be used in alternate embodiments.

Soft decision combining/decoding circuits 255 are coupled to outputs of the soft decision computing circuits 250. The samples for the co-polarized signal and the cross-polarized signal are weighted and combined in soft decision combining/decoding circuits 255. The soft decision weighting factors are derived as a function of the two orthogonal polarization samples and then applied to the samples. The weighted samples are combined and decoded in the soft decision combining/decoding circuits 255 to determine the most likely state of the coded symbols that were transmitted. To reduce added noise, the soft decision weighting factor can be set to zero when one polarization sample is substantially less than the sample from the orthogonal polarization, or alternatively, less than a threshold value. In alternate embodiments, soft decision combining/decoding circuits 255 may include additional soft decision weighting or a threshold device to discard the weaker signal under certain conditions. Demodulated symbols are sent out of output port 260.

In an alternative embodiment, a reference directed method is used to weight and combine the two signals. Desirably, a locally generated reference signal is used to compute the maximal ratio weights from the reference block in each received signal. For example, a correlation operation can be used. In this method, the weights are complex and include the phase component. When complex weights are used in the combining function, carrier phase tracking is not required. Carrier tracking loops can fail in fading systems and can be inferior to the complex weight technique.

Figure 3:
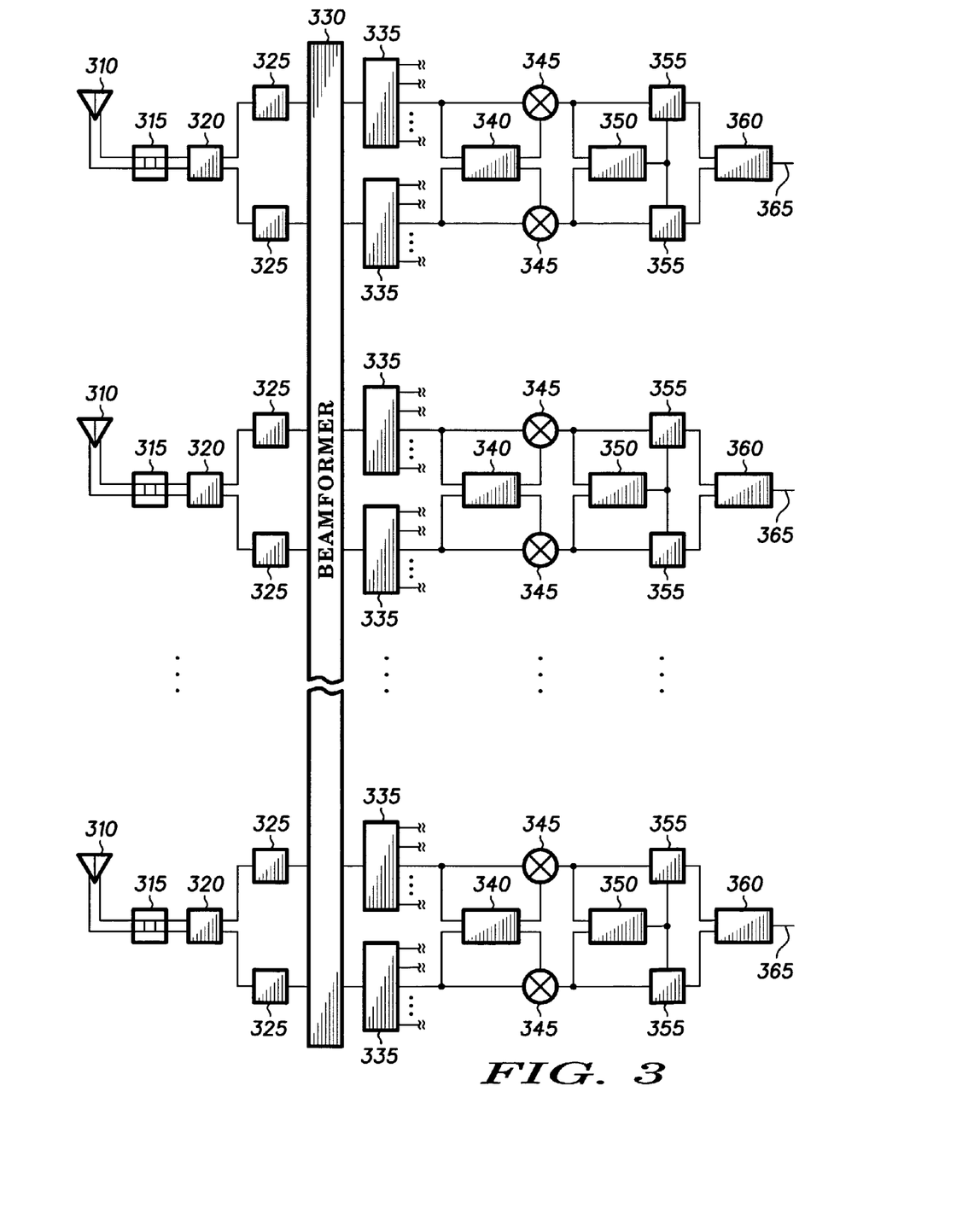
FIG. 3 shows a simplified block diagram for a satellite adapted to operate as a dual polarization reception system in accordance with a preferred embodiment of the invention.

FIG. 3 shows a simplified block diagram for a satellite adapted to operate as a dual polarization reception system in accordance with a preferred embodiment of the invention. In a preferred embodiment, satellite (110, FIG. 1) comprises a plurality of dual polarization receiver subsystems and a beamformer. The signals transmitted from a subscriber unit to a satellite can also undergo scattering and reflection producing signals with orthogonal polarizations, and the plurality of dual polarization receiver subsystems are used to receive one or more of the un-scattered signals and one or more of the scattered signals.

In a preferred embodiment, the dual polarization receiver subsystems are optimized to operate with multiple inputs. In a multi-channel, multi-user system, each channel has a different phase between the two polarizations. Therefore, the polarizations cannot be combined until the different channels are separated.

In a preferred embodiment, a satellite comprises at least one phased array antenna that further comprises elements 310. The phased array antenna receives co-polarized and cross-polarized signals.

In alternate embodiments, the phased array antenna on-board the satellite can also comprise a controller for selecting antenna polarization. In addition, the phased array antenna can be operated as a single polarization device in transmit and/or receive modes.

Hybrid couplers 315 are coupled to each element 310 and hybrid couplers 315 are used to convert from one basis set of polarizations to another, in this case from horizontal and vertical to left-hand and right-hand circular.

In a preferred embodiment, at least one downconverter 320 is coupled to each hybrid coupler 315. Incoming signals are downconverted by down-converters 320. A/D converters 325 are coupled to downconverters 320. A/D converters sample the downconverted signals.

Beamformer 330 is coupled to A/D converters 325. Beamformer 330 processes signals from each antenna element, and a plurality of beams are formed.

Demultiplexers 335 are coupled to the outputs of beamformer 330, and the signals from an individual user are demultiplexed from those received from other users. The design of the demultiplexer depends upon the multiple access scheme used in the system. In a preferred embodiment, an FDMA demultiplexer is used that comprises a plurality of channel filters. For CDMA or TD/CDMA systems, the demultiplexer would include one or more code despreading functions. For TDMA or FDMA/TDMA systems, the demultiplexer would include switching and timing functions.

Residual carrier recovery circuits 340 and 345 are coupled to demultiplexers 335 and utilize information from the co-polarized signal and the cross-polarized signal to remove Doppler shifts. Residual carrier recovery circuits, 340 and 345, individually track the residual carrier phase for the co-polarized signal and the cross-polarized signal, since significant carrier phase differences can exist between the co-polarized signal and the cross-polarized signal.

Symbol timing recovery circuit 350 is coupled to outputs on residual carrier recovery circuits 345. Symbol timing recovery is achieved using information from the co-polarized signal and the cross-polarized signal. In a preferred embodiment, there is negligible propagation delay difference compared to the symbol rate for the co-polarized signal and the cross-polarized signal, and therefore a single output from the symbol timing recovery circuit 350 is used.

Soft decision computing circuits 355 are coupled to outputs on residual carrier recovery circuits 345, and an output on symbol timing recovery circuit 350. Soft decision computing circuits 355 capture samples of the waveform at optimum times within a symbol. Thus, soft decision samples exist at the output of the soft decision computing circuits 355.

Those skilled in the art will recognize that the order in which the operations are performed could be changed in alternate embodiments.

Soft decision combining/decoding circuits 360 are coupled to outputs of the soft decision computing circuits 355. The samples for the co-polarized signal and the cross-polarized signal are weighted and combined in soft decision combining/decoding circuits 360. The soft decision weighting factors are derived as a function of the two orthogonal polarization samples and applied to the samples. The weighted samples are combined and decoded in the soft decision combining/decoding circuits 360 to determine the most likely state of the coded symbols that were transmitted. To reduce added noise, the soft decision weighting factor can be set to zero when one polarization sample is substantially less than the sample from the orthogonal polarization, or alternatively, less than a threshold value.

The preferred embodiment, as described above, does not require a significant increase in hardware complexity. For example, every beam in the system does not require the performance improvement provided by a dual polarization reception system. Hardware complexity is reduced when polarization diversity combining is used only for those environments and conditions that require the improved performance. For instance, over the oceans, polarization diversity combining may not be required.

The satellite generates beams to cover individual regions, and the users in a given region are combined into a single beam. Each beam is processed either by a single polarization receiver or by a dual polarization receiver.

In a preferred embodiment, the satellite measures the power level of the users in a beam and decides based upon that information which beams are assigned to single polarization receivers and which beams are assigned to dual polarization receivers. This procedure is illustrated in FIG. 4

Figure 5:
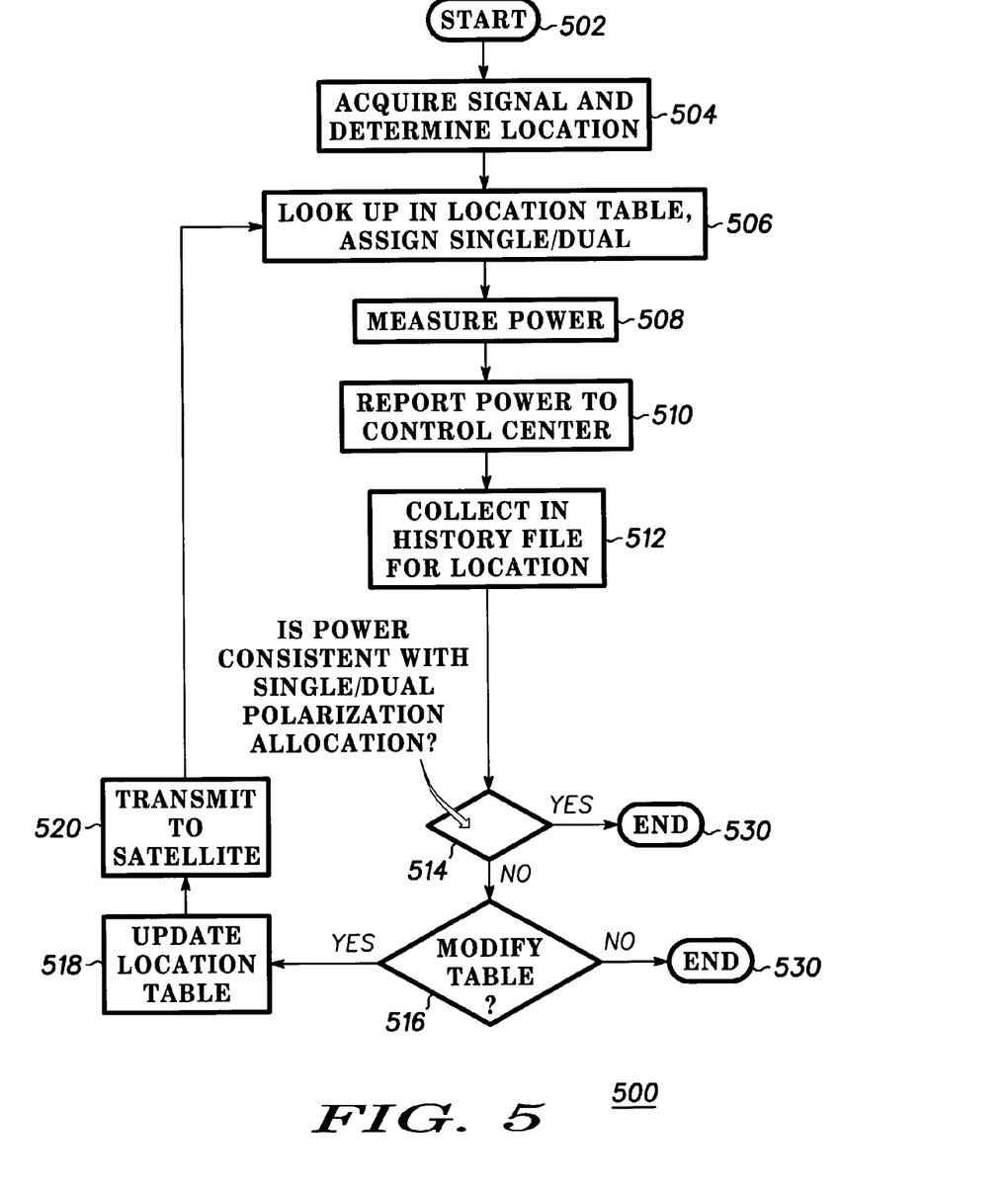
FIG. 5 illustrates a flow diagram for a method of operating a satellite in a dual-polarization reception system in accordance with an alternate embodiment of the invention.

In alternate embodiments, historical data is collected for all regions in the world. The data is collected at the ground station where world maps are generated. These maps are then broadcast to the satellite where they are stored. These maps then determine which beams are assigned to single polarization receivers and which beams are assigned to dual polarization receivers based solely on their location. This procedure is illustrated in FIG. 5.

Figure 4:
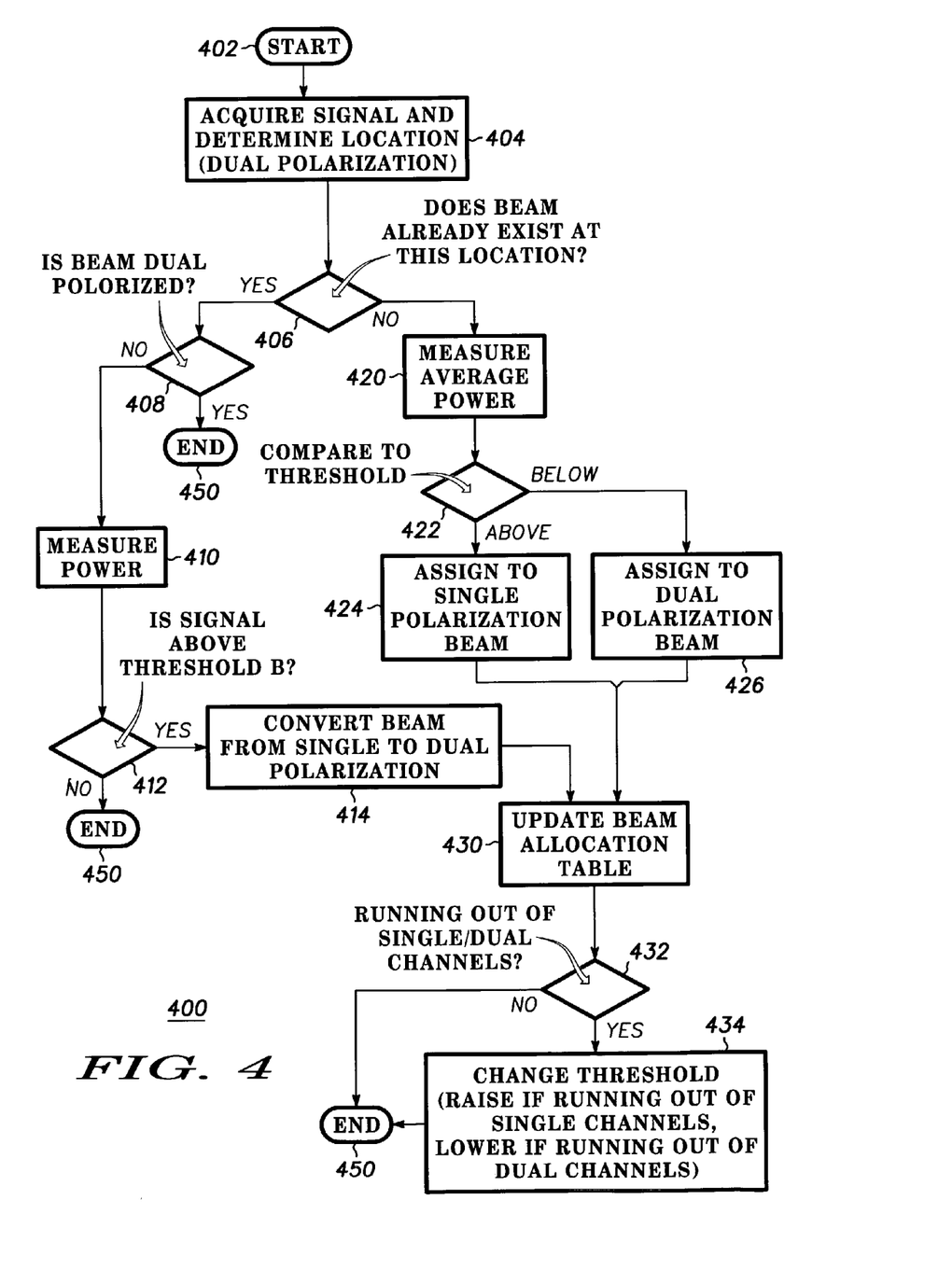
FIG. 4 illustrates a flow diagram for a method of operating a satellite in a dual-polarization reception system in accordance with a preferred embodiment of the invention.

FIG. 4 illustrates a flow diagram for a method of operating a satellite in a single/dual-polarization reception system in accordance with a preferred embodiment of the invention. In a preferred embodiment, procedure 400 is performed by at least one satellite.

Procedure 400 starts in step 402. For example, step 402 can be the result of a subscriber unit sending an access message or the result of a request from a control center in the communication system.

In step 404, the satellite acquires a signal from a subscriber unit and determines a location for the subscriber unit. The satellite receives message information from the subscriber unit, and the message information comprises location data.

In step 406, a query is performed to determine if a beam already exists at this location.

Desirably, beams can be dynamically created to service particular locations dependent upon available resource. In a preferred embodiment, a satellite can establish up to M single polarization beams and N dual polarization beams at a particular time.

When a beam exists at this location at this particular time, then procedure 400 branches to step 408. When a beam does not exist at this location at this particular time, then procedure 400 branches to step 420.

In step 408, a query is performed to determine if the beam is a dual-polarization beam. When a dual-polarization beam exists at this location at this particular time, then procedure 400 branches to step 450 and ends. When a dual-polarization beam does not exist at this location at this particular time, then procedure 400 branches to step 410.

In step 410, during the acquisition phase, the satellite measures the received average signal power in the co-polarization channel. This determines whether the channel is of sufficient power that it does not need dual polarization diversity gain.

In step 412, a query is performed to determine if the received signal power is greater than threshold value B. When the received signal power is not greater than threshold value B at this particular time, then procedure 400 branches to step 450 and ends. When the received signal power is greater than threshold value B at this particular time, then procedure 400 branches to step 414.

In step 414, the satellite converts the beam from a single polarization beam to a dual-polarization beam. This is usually accomplished by rerouting the beam from single string/single polarization hardware to dual string/dual polarization hardware. Procedure 400 continues with step 430.

In step 420, during the acquisition phase, the satellite measures the average received co-polarization power. Procedure 400 continues with step 422.

In step 422, a query is performed to determine if the received signal power is greater than a second threshold value. When the received signal power is above threshold value A at this particular time, then procedure 400 branches to step 424. When the received signal power is below threshold value A at this particular time, then procedure 400 branches to step 426.

The two thresholds can be different to allow for different weighting and hence probability between converting existing single polarization beams to dual polarization and creating new dual polarization beams.

In step 424, the beam is established as a single polarization beam, since the received power is above the second threshold. Procedure 400 continues with step 430.

In step 426, the beam is established as a dual polarization beam, since the received power is below the second threshold. Procedure 400 continues with step 430.

In step 430, the satellite updates the beam allocation table.

In step 432, a query is performed to determine if the threshold value should be changed. When the number of available dual polarization channels is less than a first limit or the number of available single polarization channels is less than a second limit, then procedure 400 branches to step 434. When the number of available dual polarization channels is not less than the first limit and the number of available single polarization channels is not less than the second limit, then procedure 400 branches to step 450 and ends.

In step 434, when the number of available dual polarization channels is less than the first limit, then the threshold value is lowered. When the number of available single polarization channels is less than the second limit, then the threshold value is raised. Procedure 400 continues to step 450 and ends.

Once a beam is allocated to either a single or dual polarization receiver, periodic measurements of all of the channel power levels are made to determine if the fading environment of any of the SUs in that region has dramatically changed. Based on this information, beams can also be converted from single polarization to dual polarization or vice versa.

FIG. 5 illustrates a flow diagram allocating beams on a satellite to either dual-polarization reception or single polarization reception in accordance with an alternate embodiment of the invention. In this embodiment, procedure 500 is performed by at least one satellite.

Procedure 500 starts in step 502. For example, step 502 can be the result of a subscriber unit being sent an access message or the result of a subscriber unit requesting access to the communication system.

In step 504, the satellite acquires a signal from a subscriber unit and determines a location for the subscriber unit.

In step 506, the satellite uses the location information to determine whether to operate in the single polarization or dual polarization mode. In a preferred embodiment, a table lookup is performed using the subscriber unit's current location.

In step 508, the power is measured in the co-polarized channel.

In step 510, the measured power is reported to the system control center.

In step 512, the measured power is stored in a history file for the subscriber's current location.

In step 514, a query is performed to determine if the measured power is consistent with the single/dual polarization allocation that has been made for this beam. When the measured power is not consistent with the single/dual polarization allocation that has been made for this beam, then procedure 500 branches to step 516. When the measured power is consistent with the single/dual polarization allocation that has been made for this beam, then procedure 500 branches to step 530 and ends.

In step 516, a query is performed to determine if the allocation/location table requires modification. When the allocation/location table requires modification, then procedure 500 branches to step 518. When the allocation/location table does not require modification, then procedure 500 branches to step 530 and ends.

In step 518, the allocation/location table is updated.

In step 520, update information is sent to the currently serving satellite. Procedure 500 branches to step 506, and procedure 500 iterates as shown in FIG. 5.

In alternate embodiments, the satellite and the subscriber unit can dynamically change their transmit and/or receive polarization (i.e., right hand circular polarization (RHCP) and left hand circular polarization (LHCP)). The satellite and/or the subscriber unit can determine a received polarization mode, and the satellite and/or the subscriber unit can take advantage of received polarization knowledge to control, in real time, the transmitted signal polarization. The satellite and/or the subscriber unit can generate polarization mode data, and the satellite and/or the subscriber unit can receive and use polarization mode data.

For example, a subscriber unit can determine that it is currently operating using a first polarization in the receive mode (i.e., first polarization signals are strongest). The subscriber unit can also determine that the first polarization is the best one to use for the transmit mode and transmits data using the first polarization. In addition, a subscriber unit can send polarization mode data to the satellite to inform the satellite that it should also use the first polarization method in the receive mode because the subscriber unit has determined that the first polarization was the one to use. In some embodiments, the satellite uses the polarization mode data to switch polarization modes, and in other embodiments, the satellite uses the polarization mode data to perform a link analysis.

In addition, a satellite can determine that it is currently operating using a first polarization in the receive mode (i.e., first polarization signals are strongest). The satellite can also determine that the first polarization is the best one to use for the transmit mode and transmits data using the first polarization. In addition, a satellite can send polarization mode data to the subscriber unit to inform the subscriber unit that it should also use the first polarization method in the receive mode because the subscriber unit has determined that the first polarization was the one to use. In some embodiments, the subscriber unit uses the polarization mode data to switch polarization modes, and in other embodiments, the subscriber unit uses the polarization mode data to perform a link analysis.

In other alternate embodiments, message priority levels can be used by a satellite and/or a subscriber unit to determine when to operate in a single or a dual polarization mode. For example, some message data with high message priority levels can cause a satellite and/or a subscriber unit to operate in a dual polarization mode to ensure that the message data has a higher probability of being received. Message priority levels are established by the system and are based on system information and subscriber information. For example, emergency messages are given higher priority levels.

In summary, a dual polarization reception system has been described. The invention has been described above with reference to a preferred embodiment. However, those skilled in the art will recognize that changes and modifications can be made in this preferred embodiment without departing from the scope of the invention. For example, the block diagrams identified herein can be categorized and organized differently than described herein while achieving equivalent results. In addition, the number of functional blocks and method for interconnecting the functional blocks could be different from that described in the preferred embodiment. These and other changes and modifications, which are obvious to those skilled in the art, are intended to be included within the scope of the invention.

What is claimed is:

1. A method of operating a satellite in a dual-polarization reception system, said method comprising the steps of:

acquiring a signal from a subscriber unit via an access channel;

determining a location for said subscriber unit, wherein said satellite receives message information comprising location data;

determining if a dual-polarization beam exists at said location;

measuring received signal power, when said dual-polarization beam exists at said location;

determining whether said received signal power is greater than a first threshold value;

converting from a single polarization beam to a dual-polarization beam, when said received signal power is greater than said first threshold value; and updating a beam allocation table.

2. The method as claimed in claim 1, wherein said method further comprises the steps of:

measuring average received signal power, when a beam does not exist at said location;

comparing said avenge received signal power to a second threshold;

assigning a single polarization beam to said location when said average received signal power is greater than said second threshold;

assigning a dual polarization beam to said location when said average received signal power is not greater than said second threshold; and updating said beam allocation table.

3. The method as claimed in claim 2, wherein said method further comprises the steps of:

lowering said second threshold, when the number of available dual polarization channels is less than a first limit; and raising said second threshold when the number of available single polarization channels is less than a second limit.

4. A method of operating a subscriber unit (SU) in a dual-polarization reception system, said method comprising the steps of:

acquiring a signal from a satellite via a broadcast channel;

determining a location for said subscriber unit, said SU self-determining said location;

determining from a beam allocation table a beam assignment at said location;

measuring co-polarized signal power and cross-polarized signal power at said location;

determining whether said measured co-polarized signal power and said measured cross-polarized signal power are consistent with said beam assignment;

modifying said beam assignment, when said measured co-polarized signal power or said measured cross-polarized signal power is not consistent with said beam assignment; and updating said beam allocation table.

5. The method as claimed in claim 4, wherein said method further comprises the step of transmitting beam assignment modifications to a satellite.

6. The method as claimed in claim 4, wherein said method further comprises the step of reporting said measured co-polarized signal power and said measured cross-polarized signal power to a system control center.

7. The method as claimed in claim 4, wherein said method further comprises the step of storing said measured co-polarized signal power and said measured cross-polarized signal power in a history file for said location.

* * * * *